(12) United States Patent
Choi et al.

(10) Patent No.: US 10,451,772 B2
(45) Date of Patent: Oct. 22, 2019

(54) MANUFACTURING DEVICE OF ANTI-REFLECTING STRUCTURE AND MANUFACTURING METHOD FOR THE ANTI-REFLECTING STRUCTURE USING THEREOF

(71) Applicants: Eui-Sun Choi, Seoul (KR); Nam-Ii Koo, Hwaseong-si (KR); Ji-Min Lee, Seoul (KR); Hyung-Kyu Lee, Seoul (KR); Min-Seok Choi, Hwaseong-si (KR)

(72) Inventors: Eui-Sun Choi, Seoul (KR); Nam-Ii Koo, Hwaseong-si (KR); Ji-Min Lee, Seoul (KR); Hyung-Kyu Lee, Seoul (KR); Min-Seok Choi, Hwaseong-si (KR)

(73) Assignee: Samsung Electronics, Co., Ltd., Gyeonggi-do (KR)

( * ) Notice: Subject to any disclaimer, the term of this patent is extended or adjusted under 35 U.S.C. 154(b) by 756 days.

(21) Appl. No.: 14/991,483

(22) Filed: Jan. 8, 2016

(65) Prior Publication Data
US 2016/0229165 A1    Aug. 11, 2016

(30) Foreign Application Priority Data
Feb. 5, 2015    (KR) .......................... 10-2015-0017903

(51) Int. Cl.
*B29C 33/00*    (2006.01)
*B29C 43/00*    (2006.01)
(Continued)

(52) U.S. Cl.
CPC ..................................... *G02B 1/11* (2013.01)

(58) Field of Classification Search
CPC ....... B29C 33/00; B29C 33/40; B29C 33/424; B29C 2033/426; B29C 43/00;
(Continued)

(56) References Cited

U.S. PATENT DOCUMENTS 7,242,031 B2    7/2007    Sakai
7,600,881 B2    10/2009   Sakai
(Continued)

FOREIGN PATENT DOCUMENTS

JP    2005251875 A    9/2005
JP    2006332433 A    12/2006
(Continued)

*Primary Examiner* — Seyed Masoud Malekzadeh
*Assistant Examiner* — Matthew Hoover
(74) *Attorney, Agent, or Firm* — Harness, Dickey & Pierce, P.L.C.

(57) ABSTRACT

Example embodiments relate to a manufacturing device of an anti-reflecting structure and a method for manufacturing the anti-reflecting structure. The manufacturing device of an anti-reflecting structure includes a carrier film on which a stamp structure is formed, an unwinding unit which unwinds the carrier film, a substrate support unit which provides a target substrate to the carrier film, a pressing unit which applies pressure to the carrier film so that a resin provided in the stamp structure is provided to the target substrate, and a winding unit which winds the carrier film from which an anti-reflecting pattern is transferred to the target substrate, wherein the pressing unit includes a chamber which stores the target substrate, and a vent hole formed in the chamber, and air within the chamber is discharged through the vent hole to lower the air pressure in the chamber and apply pressure to the carrier film.

18 Claims, 21 Drawing Sheets

(51) Int. Cl.
  *B29C 47/00* (2006.01)
  *B29C 51/00* (2006.01)
  *B29C 53/00* (2006.01)
  *B29C 59/00* (2006.01)
  *G02B 1/11* (2015.01)

(58) Field of Classification Search
  CPC ......... B29C 43/20; B29C 43/22; B29C 47/00;
      B29C 47/04; B29C 51/00; B29C 51/10;
      B29C 51/18; B29C 53/00; B29C 53/20;
      B29C 53/24; B29C 59/00; B29C 59/02;
      B29C 59/022; B29C 2059/023
  See application file for complete search history.

(56) References Cited

U.S. PATENT DOCUMENTS

| | | | |
|---|---|---|---|
| 8,102,494 B2 | 1/2012 | Nishida et al. | |
| 8,431,004 B2 | 4/2013 | Taguchi et al. | |
| 8,467,023 B2 | 6/2013 | Nishida et al. | |
| 8,759,738 B2 | 6/2014 | Kuboi | |
| 2007/0014886 A1* | 1/2007 | Hennessey | B29C 43/222 425/471 |
| 2011/0176216 A1 | 7/2011 | Kawauchi et al. | |
| 2012/0319562 A1 | 12/2012 | Ra | |
| 2013/0004612 A1 | 1/2013 | Isurugi et al. | |
| 2013/0155522 A1 | 6/2013 | Jeong et al. | |
| 2013/0224636 A1* | 8/2013 | Kobrin | G03F 1/00 430/5 |
| 2014/0072768 A1* | 3/2014 | Sugiura | B29C 59/04 428/156 |
| 2014/0221568 A1 | 8/2014 | Kikuta et al. | |
| 2014/0367554 A1 | 12/2014 | Kuboi | |

FOREIGN PATENT DOCUMENTS

| | | |
|---|---|---|
| JP | 2007203678 A | 8/2007 |
| JP | 2011048000 A | 3/2011 |
| JP | 2012174885 A | 9/2012 |
| JP | 2012212019 A | 11/2012 |
| KR | 100656082 B1 | 12/2006 |
| KR | 100951915 B1 | 4/2010 |
| KR | 101363473 B1 | 2/2014 |
| KR | 20140061901 A | 5/2014 |

\* cited by examiner

MANUFACTURING DEVICE OF ANTI-REFLECTING STRUCTURE AND MANUFACTURING METHOD FOR THE ANTI-REFLECTING STRUCTURE USING THEREOF

CROSS-REFERENCE TO RELATED APPLICATION

This application claims priority from Korean Patent Application No. 10-2015-0017903 filed on Feb. 5, 2015 in the Korean Intellectual Property Office, and all the benefits accruing therefrom under 35 U.S.C. 119, the contents of which in their entirety are herein incorporated by reference.

BACKGROUND

1. Technical Field

The inventive concepts relate to a manufacturing device of an anti-reflecting structure and/or a manufacturing method for the anti-reflecting structure using the same.

2. Description of the Related Art

In an image display device, a screen to be displayed may not clearly seen for reasons such as reflection of peripheral objects or landscape on the screen due to a surface reflection of external light. As the display screen increases in size, and as the periphery is bright, more surface reflection occurs. If the surface reflection is intensified, since the screen to be displayed is covered, a user who is watching the screen may not be able to see an image well and may experience an inconvenience.

In order to reduce or substantially prevent surface reflection due to external light reflection, methods of attaching an anti-reflecting film to a display screen of an image display device have been suggested. The anti-reflecting film typically can enable a user to clearly observe the light emitted from the image display device itself and can achieve bright colors on the display screen, by reducing the external incident light of the image display device, such as a liquid crystal display device, a plasma display panel (PDP) and an electro-luminescence (EL) display.

SUMMARY

Example embodiments of the inventive concepts relate to a manufacturing device of an anti-reflecting structure which is able to increase the anti-reflecting efficiency and to achieve an increase in sensitivity and noise reduction through an increased SNR (Signal-to-Noise Ratio), by uniformly forming an anti-reflecting nano-structure on a target substrate having a curved shape.

Example embodiments of the inventive concepts relate to a method for manufacturing the anti-reflecting structure which is able to increase the anti-reflecting efficiency and to achieve an increase in sensitivity and a noise reduction through an increased SNR (Signal-to-Noise Ratio), by uniformly forming an anti-reflecting nano-structure on a target substrate having a curved shape.

Example embodiments of the inventive concepts are not limited to the above-mentioned example embodiments, and other example embodiments that have not been mentioned will be clearly understood by those skilled in the art from the following description.

According to example embodiments of the inventive concepts, there is provided a manufacturing device of an anti-reflecting structure including a carrier film on which a stamp structure is formed, an unwinding unit which unwinds the carrier film, a substrate support unit which provides a target substrate to the carrier film, a pressing unit which applies pressure to the carrier film so that a resin provided in the stamp structure is provided to the target substrate, and a winding unit which winds the carrier film from which an anti-reflecting pattern is transferred to the target substrate, wherein the pressing unit includes a chamber which stores the target substrate, and a vent hole formed in the chamber, and air within the chamber is discharged through the vent hole to lower the air pressure in the chamber and apply pressure to the carrier film.

According to example embodiments of the inventive concepts, there is provided a manufacturing device of an anti-reflecting structure including a carrier film on which a stamp structure applied with a first resin is formed, an unwinding unit which unwinds the carrier film, a substrate support unit which provides a planar substrate or a target substrate to the carrier film, and a winding unit which winds the carrier film from which an anti-reflecting pattern is transferred to the target substrate, wherein a second resin is applied onto the planar substrate, at least a part of the second resin is provided to the stamp structure, and the second resin provided to the stamp structure is provided to the target substrate to form the anti-reflecting pattern on the target substrate.

According to example embodiments of the inventive concepts, there is provided a manufacturing device of an anti-reflecting structure including first and second chambers, a stamp structure provided in the first chamber, a planar substrate which is provided in the first chamber and to which the first resin is applied, and a target substrate provided in the second chamber, wherein at least a part of the first resin is provided to the stamp structure by contact between the stamp structure and the planar substrate within the first chamber, the stamp structure provided with the first resin moves to the second chamber, and the stamp structure provides the first resin to the target substrate to form an anti-reflecting pattern on the target substrate.

According to example embodiments of the inventive concepts, there is provided a method for manufacturing an anti-reflecting structure including providing a stamp structure, and a planar substrate to which a first resin is applied, bringing the planar substrate and the stamp structure into contact with each other to provide at least a part of the first resin to the stamp structure, providing the first resin, which has been provided to the stamp structure, to a target substrate, and curing the first resin on the target substrate to complete an anti-reflecting structure.

According to example embodiments of the inventive concepts, there is provided a method for manufacturing an anti-reflecting structure including providing a carrier film formed with a stamp structure into a chamber, providing a planar substrate applied with a first resin to the carrier film within the chamber, discharging air within the chamber through a vent hole formed in the chamber to lower an air pressure within the chamber and bring the stamp structure and the planar substrate into contact with each other, injecting air into the chamber through the vent hole to separate the stamp structure and the planar substrate and provide at least a part of the first resin to the stamp structure, providing a target substrate into the chamber, discharging the air within the chamber through the vent hole to lower the air pressure within the chamber and bring the stamp structure and the target substrate into contact with each other, injecting the air into the chamber via the vent hole to separate the stamp structure and the target substrate and provide the first resin provided in the stamp structure to the target substrate, and curing the first resin on the target substrate to complete an anti-reflecting structure.

BRIEF DESCRIPTION OF THE DRAWINGS

The above and other example embodiments and features of the inventive concepts will become more apparent by describing in detail example embodiments thereof with reference to the attached drawings, in which.

DETAILED DESCRIPTION OF THE EMBODIMENTS

Figure 1:
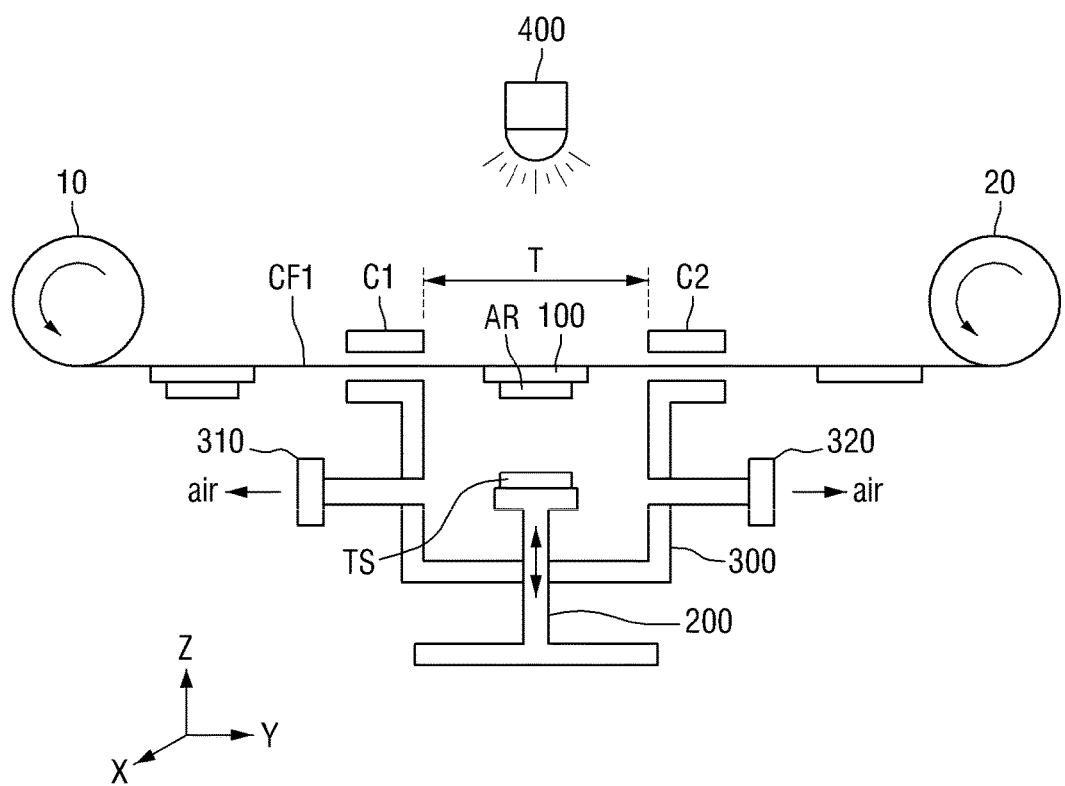
FIG. 1 is a cross-sectional view of a manufacturing device of an anti-reflecting structure according to an example embodiment of the inventive concepts.

The example embodiments will now be described more fully hereinafter with reference to the accompanying drawings, in which example embodiments are shown. The example embodiments may, however, be embodied in different forms and should not be construed as limited to the example embodiments set forth herein. Rather, these example embodiments are provided so that this disclosure will be thorough and complete, and will filly convey the scope of the example embodiments to those skilled in the art. The same reference numbers indicate the same components throughout the specification. In the attached figures, the thickness of layers and regions is exaggerated for clarity.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless defined otherwise, all technical and scientific terms used herein have the same meaning as commonly understood by one of ordinary skill in the art to which the example embodiments belongs. It is noted that the use of any and all examples, or example terms provided herein is intended merely to better illuminate the example embodiments and is not a limitation on the scope of the example embodiments unless otherwise specified. Further, unless defined otherwise, all terms defined in generally used dictionaries may not be overly interpreted. As used herein, expressions such as "at least one of," when preceding a list of elements, modify the entire list of elements and do not modify the individual elements of the list.

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

The example embodiments will be described with reference to perspective views, cross-sectional views, and/or plan views, in which example embodiments are shown. Thus, the profile of an example view may be modified according to manufacturing techniques and/or allowances. That is, the embodiments of the example embodiments are not intended to limit the scope of the example embodiments but cover all changes and modifications that can be caused due to a change in manufacturing process. Thus, regions shown in the drawings are illustrated in schematic form and the shapes of the regions are presented simply by way of illustration and not as a limitation.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

The inventive concepts relate to an anti-reflecting nano-structure in which a stylized anti-reflecting structure capable of controlling the period and height is formed on a curved shape to improve the performance of an optical product. In the case of an optoelectronic product which includes an anti-reflecting structure manufactured using the manufacturing device of the anti-reflecting structure according to the inventive concepts, it is possible to expect an improvement in reflection efficiency, an increase in sensitivity and a noise reduction through an increase in SNR (Signal Noise Ratio).

Hereinafter, a manufacturing device of an anti-reflecting nano-structure according to example embodiments of the inventive concepts will be described.

Figure 2:
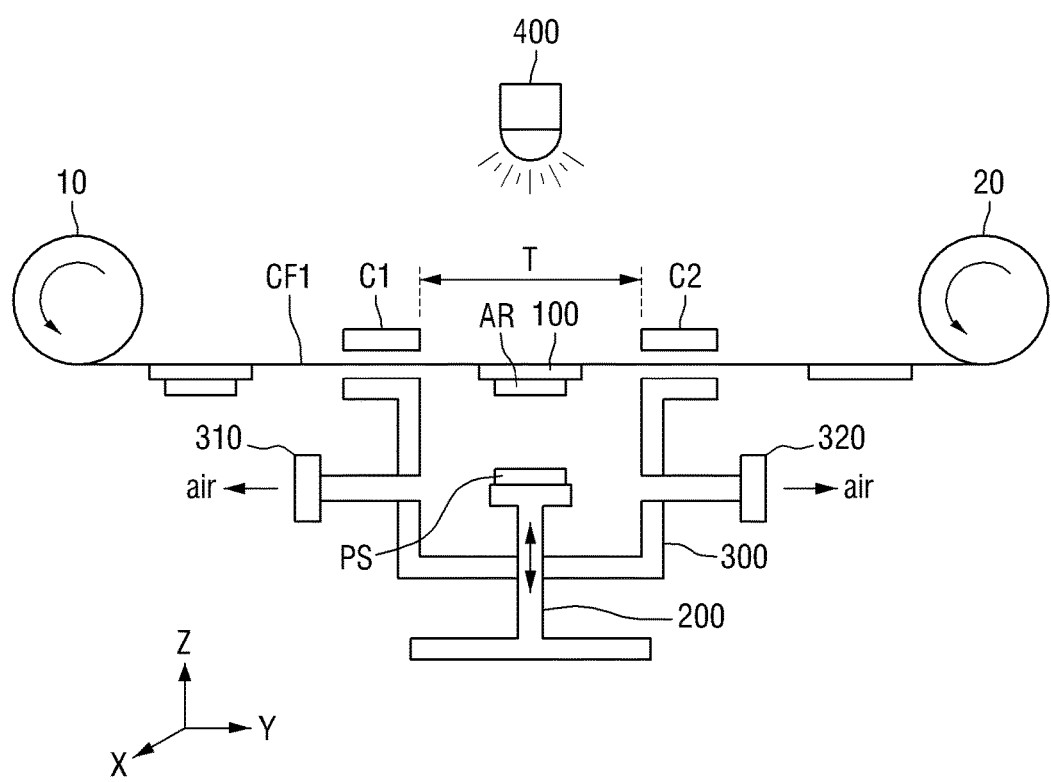
FIG. 2 is a diagram for describing an operation of the manufacturing device of the anti-reflecting structure according to an example embodiment of the inventive concepts.
Figure 3:
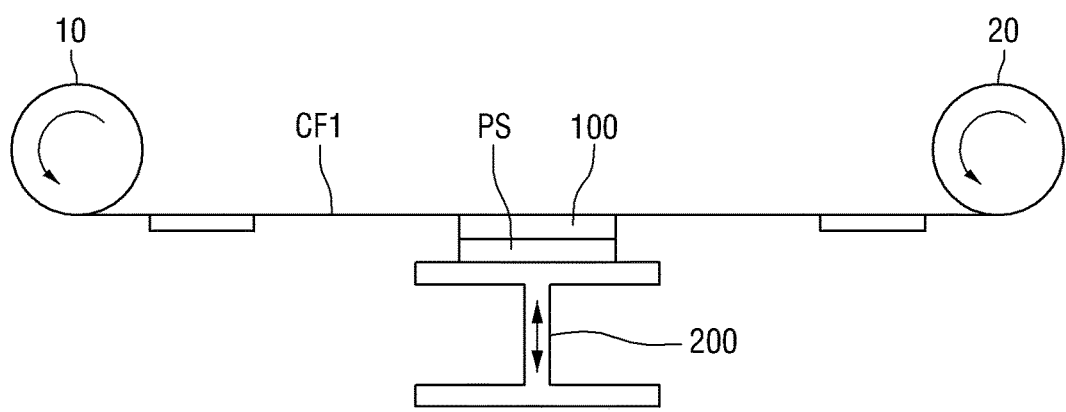
FIGS. 3 and 4 are diagrams for describing a method for moving a resin to a stamp structure, according to an example embodiment.
Figure 4:
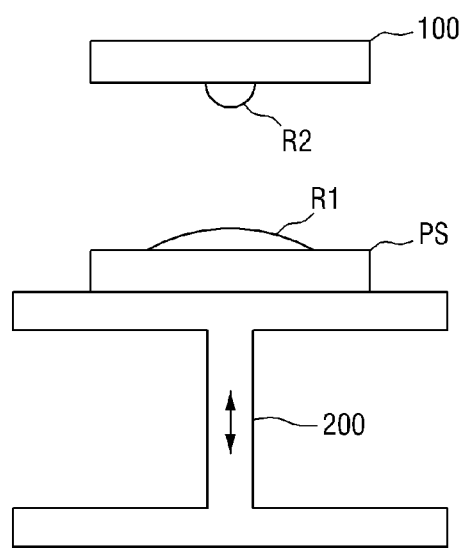

FIG. 1 is a cross-sectional view of a manufacturing device of an anti-reflecting structure according to an example embodiment of the inventive concepts. FIG. 2 is a diagram for describing the operation of the manufacturing device of the anti-reflecting structure according to an example embodiment of the inventive concepts. FIGS. 3 and 4 are diagrams for describing an example method for moving a resin to a stamp structure.

Referring to FIG. 1, a manufacturing device 1 of an anti-reflecting structure according to an example embodiment of the inventive concepts includes an unwinding unit 10, a stamp structure 100, a substrate support unit 200, a winding unit 20, a heating unit 400, a chamber 300, vent holes 310, 320 and the like.

According to example embodiment, the unwinding unit 10 unwinds a carrier film CF1 in which a target area T is defined and a stamp structure 100 is formed in the target area T. Multiple stamp structures 100 can be formed on one surface of the carrier film CF1. Since the manufacturing device 1 of the example anti-reflecting structure according to the inventive concepts uses a roll-to-roll process, the process rapidity can be increased. Since the carrier film CF1 is provided in a roll type between the unwinding unit 10 and the winding unit 20, it can be formed of or include a flexible substrate. While the stamp structures 100 formed on one surface of the carrier film CF1 are continuously provided, it is possible to transfer the anti-reflecting structure AR to the target substrate TS.

The stamp structure 100 is formed by duplicating an anti-reflecting pattern ARP formed on a master substrate MS. A method for forming the stamp structure 100 will be described below. A first material is applied onto the anti-reflecting pattern ARP formed on the master substrate MS, and the first material in a state before curing is cured after the movement to the carrier film CF1 to form the stamp structure 100. The first material for forming the stamp structure 100 is a liquid-state material before curing so that it is possible to reproduce a nano-sized pattern of the master substrate MS, and the first material may be a flowable material so as to be able to tightly fill the space of the anti-reflecting pattern ARP on the master substrate MS. Moreover, the first material may be able to be cured at a low shrinkage rate by receiving the provision of light or heat, and may be a material having the high light-transmitting transparency. Further, the first material requires the flexible nature so as to be able to follow the curved surface of the target substrate TS when manufacturing the anti-reflecting structure AR. Also, the first material must have releasability from the cured anti-reflective structure AR.

In order to have the above-mentioned characteristics, the first material used in the inventive concepts, for example, can contain polydimethysiloxane. The polydimethysiloxane can be cured by ultraviolet ray, and since polydimethysiloxane has a high releasability from the master substrate MS or the anti-reflecting structure AR due to low surface energy, it can be more easily used for forming the nano-sized anti-reflecting structure AR.

The substrate support unit 200 sequentially provides a planar substrate PS and the target substrate TS to the target area T of the carrier film CF1. The substrate support unit 200 moves in a vertical direction (Z-direction) and can be operated so that the planar substrate PS or the target substrate TS on the substrate support unit 200 comes into contact with the stamp structure 100.

Referring to FIGS. 2 and 4, when the planar substrate PS is placed on the substrate support unit 200, a first resin R1 may be applied onto the planar substrate PS, and when the planar substrate PS comes into contact with the stamp structure 100, at least a part of the first resin R1 can be provided to the stamp structure 100. The first resin R1 applied onto the planar substrate PS is in a liquid state before curing, and the first resin R1 is cured to form the anti-reflecting structure AR. Therefore, the first resin R1 may be a flowable material so as to be able to tightly fill the space between the nano-sized anti-reflecting patterns ARP reproduced to the stamp structure 100. The application of the first resin R1 onto the planar substrate PS can be achieved via, for example, spin coating. Thus, it may be possible to apply the first resin R1 onto the planar substrate PS in a uniform thin film form. Further, the first resin R1 may have adhesion to the target substrate TS as well as exhibit low shrinkage rate after curing, and requiring a lower energy for the curing process. Further, in the first resin R1, refractive index of a visible light area in a cured state may be substantially the same as that of the target substrate TS. When the refractive index between the first resin R1 and the target substrate TS is significantly different in the cured state, since there is a possibility of the additional reflection at an interface, the refractive index between the first resin R1 and the target substrate TS may be substantially the same in the cured state. Further, the first resin R1 may have low absorptivity of light in the visible light area in the cured state, and for example the absorptivity of light in the visible light area may be close to zero.

To have the above-mentioned characteristics, the first resin R1 used in the inventive concepts, for example, can include acrylic materials or epoxy-based materials. The first resin R1 can include a photo-curable organic/inorganic complex polymer material so that the refractive index is substantially the same as the target substrate TS in regard to light of the visible light area.

Referring again to FIG. 1, after at least a part of the first resin R1 is provided to the stamp structure 100, the first resin R1 provided to the stamp structure 100 is provided to the target substrate TS. That is, the target substrate TS comes into contact with the stamp structure 100 by the substrate support unit 200, and after the first resin R1 is provided to the target substrate TS, the anti-reflecting structure AR can be completed by curing the first resin R1 on the target substrate TS.

For example, to sequentially provide the planar substrate PS and the target substrate TS to the target area T of the carrier film CF1 by the substrate support unit 200, the planar substrate PS and the target substrate TS can be sequentially provided onto the substrate support unit 200, while the substrate support unit 200 moves in one direction (for example, X-direction). First, the first resin R1 is applied onto the planar substrate PS, at least a part of the first resin R1 is provided to the stamp structure 100, and after the first resin R1 provided to the stamp structure 100 is provided to the target substrate TS again and cured, the anti-reflecting structure AR can be formed on the target substrate TS.

The winding unit 20 winds the carrier film CF1 that includes the stamp structure 100 from which the anti-reflecting structure AR is transferred to the target substrate TS. That is, the carrier film CF1 is moved between the unwinding unit 10 and the winding unit 20.

The heating unit 400 heats and cures the first resin R1 which is provided to the target substrate TS. When the first resin R1 on the target substrate TS is cured, the anti-reflecting structure AR is completed. In the inventive concepts, light and heat can be applied to the first resin R1 by providing ultraviolet ray from the heating unit 400, and thus, the first resin R1 can be cured.

The vent holes 310, 320 are formed in the chamber 300, the air pressure in the chamber 300 is lowered by discharging the air in the chamber 300 through the vent holes 310, 320, and the pressure can be applied to the carrier film CF1. The chamber 300 is formed by an enclosed space, and the planar substrate PS or the target substrate TS can be present within the chamber 300. The upper part of the chamber 300 may be fixed via clamps C1, C2, and in the case of a stopped state in which the carrier film CF1 is not transported, after the upper part of the chamber 300 is fixed with the clamps C1, C2, the air in the chamber 300 may be discharged through the vent holes 310, 320, and the air pressure in the chamber 300 can be lowered. With such an operation, it is possible to apply pressure to the carrier film CF1, and the pressure is also applied to the stamp structure 100 formed in the target area T of the carrier film CF1, which makes it possible to induce contact between the stamp structure 100 and the planar substrate PS, or between the stamp structure 100 and the target substrate TS. For such an operation, the carrier film CF1 may be formed by a flexible substrate.

FIGS. 3 and 4 illustrate a method for moving at least a part of the first resin R1 onto the stamp structure 100 used in the inventive concepts. In order to move the first resin R1, which has been applied onto the planar substrate PS, to the stamp structure 100, a second resin R2 may also be applied onto the stamp structure 100, after bringing the first resin R1 and the second resin R2 into contact with each other, the stamp structure 100 and the planar substrate PS are separated from each other at a constant velocity, and the first resin R1 can be uniformly moved onto the stamp structure 100. That is, if the stamp structure 100 and the first resin R1 are brought into direct contact with each other, there is a possibility of an occurrence of failure where air bubbles are collected due to the irregular contact between the stamp structure 100 and the fluid. In order to overcome this problem, after the first resin R1 is applied onto the planar substrate PS and the second resin R2 is applied onto the stamp structure 100, by bringing the first resin R1 and the second resin R2 into contact with each other and subsequently separating the first and second resins R1 and R2 from each other, it is possible to uniformly move the first resin R1 onto the stamp structure 100.

For example, the first resin R1 and the second resin R2 can contain the same material. A first curvature of the first resin R1 can be smaller than a second curvature of the second resin R2. Since the second resin R2 can be attached onto the stamp structure 100 in the direction of the ground, the second resin R2 applied onto the stamp structure 100 may be applied at an amount smaller than the first resin R1, and the second curvature of the resin R2 can be larger than the first curvature of the resin R1 due to gravity pulling the second resin R2 towards the ground. With the shapes of the first resin R1 and the second resin R2 as discussed above, when the planar substrate PS comes into contact with the stamp structure 100, the first resin R1 and the second resin R2 may form a point-contact. After the point-contact between the first resin R1 and the second resin R2 is formed, at least a part of the first resin R1 can be uniformly provided on the stamp structure 100, while the stamp structure 100 and the planar substrate PS are separated from each other.

Figure 5:
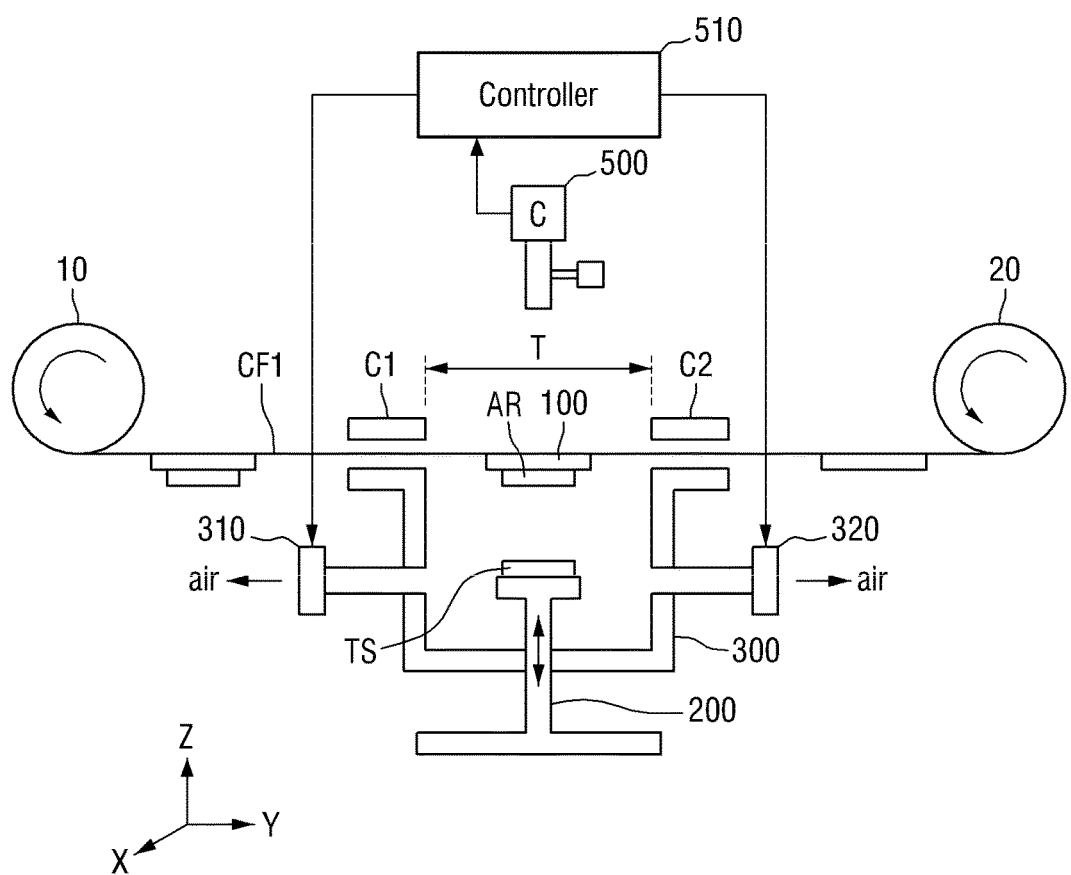
FIG. 5 is a cross-sectional view of a manufacturing device of an anti-reflecting structure according to another example embodiment of the inventive concepts.
Figure 6:
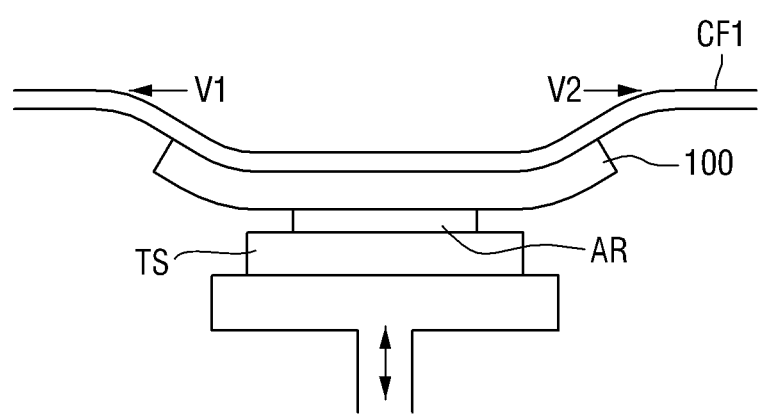
FIGS. 6 and 7 are diagrams for describing an operation of the manufacturing device of the anti-reflecting structure according to another example embodiment of the inventive concepts.
Figure 7:
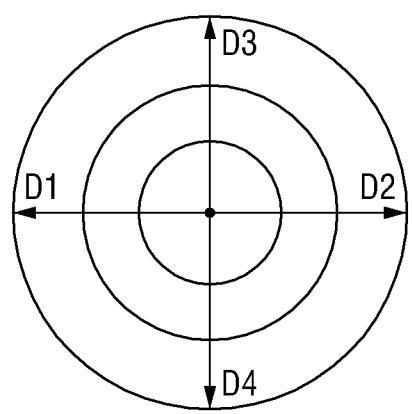

FIG. 5 is a cross-sectional view of a manufacturing device of an anti-reflecting structure according to another example embodiment of the inventive concepts. FIGS. 6 and 7 are diagrams describing the operation of the manufacturing device of the anti-reflecting structure according to another example embodiment of the inventive concepts. For convenience of explanation, substantially the same parts as those of the manufacturing device of the anti-reflecting structure according to one example embodiment of the inventive concepts will not be described.

Referring to FIG. 5, a manufacturing device 2 of an anti-reflecting structure according to another example embodiment of the inventive concepts includes an unwinding unit 10, a stamp structure 100, a substrate support unit 200, a winding unit 20, a chamber 300, vent holes 310, 320, an imaging unit 500, a controller 510 and the like.

The unwinding unit 10, the stamp structure 100, the substrate support unit 200, the winding unit 20, the chamber 300, and the vent holes 310, 320 are substantially the same as those described above.

According to various example embodiments, the imaging unit 500 is configured to recognize an amount of change in an area of contact between the carrier film CF1 and the target substrate TS. The imaging unit 500, for example, can include a vision recognition camera. The imaging unit 500 can be disposed on an upper part of the manufacturing device 2 of the anti-reflecting structure, and in particular, the imaging unit 500 can be disposed on the target area T of the carrier film CF1. Referring to FIGS. 6 and 7, it is possible to apply the pressure to the carrier film CF1, while discharging the air within the chamber 300 through the vent holes 310, 320 of the chamber 300, and FIGS. 6 and 7 illustrate an operation in which the stamp structure 100 formed in the target area T of the carrier film CF1 comes into contact with the target substrate TS at this time.

Since the carrier film CF1, the stamp structure 100 and the anti-reflecting structure AR are formed of or include a material having flexibility, as the pressure is applied to the carrier film CF1, the contact area may become gradually wider, while the stamp structure 100 comes into contact with the target substrate TS from the center of the target area T. At this time, by recognizing an amount of increase of the contact area between the stamp structure 100 and the target substrate TS through the imaging unit 500 disposed on the upper part of the target area T, it is possible to adjust the increase velocity of the contact area in the directions (D1 to D4) in which the contact area increases at a constant velocity.

For example, the controller 510 is connected to the vent holes 310, 320 to be able to control the operation of the vent holes 310, 320, and can also adjust the intensity of the pressure applied to the carrier film CF1 by controlling the operation of the vent holes 310, 320. By adjusting the intensity of pressure applied to the carrier film CF1, it is possible to control the increase velocity of the contact area between the stamp structure 100 and the target substrate TS to become a constant velocity.

For example, as the reason for controlling the increase velocity of the contact area to become a constant velocity, in order to form the anti-reflecting structure AR formed on the stamp structure 100 so as to come into uniform contact with the target substrate TS and in order to reduce or substantially prevent an occurrence of failure due to air bubbles at the contact interface, the increase velocity of the contact area is controlled.

The operating principle can be used in the operation of forming the anti-reflecting structure AR, which is formed on the stamp structure 100, on the target substrate TS, the operation of separating the first material from the master substrate MS in the operation for forming the stamp structure 10, the operation of separating the first resin R1 from the planar substrate PS to move the first resin R1 to the stamp structure 100 or the like.

The recognition results of the imaging unit 500 using the vision recognition camera are sent to the controller 510, the controller 510 can control the operation of the vent holes 310, 320, and the controller 510 can also control the height adjustment operation of the substrate support unit 200 in the vertical direction (Z-direction).

It is possible to reduce or substantially prevent an occurrence of air bubbles at the interface between the anti-reflecting structure AR as a final structure and the target substrate TS by controlling the contact/release velocity of the substrate and the stamp structure 100 to become a constant velocity, and it is also possible to enhance the anti-reflecting efficiency of the anti-reflecting structure AR by reducing or substantially preventing an occurrence of air bubbles within the anti-reflecting structure AR.

For example, even if the substrate has a curved surface rather than a planar surface, it is possible to control the contact/release velocity of the substrate and the stamp structure 100 to become a constant velocity, by the use of the recognition result of the imaging unit 500 disposed above the target area T. In a case where the surface of the substrate is a curved surface, when calculating the amount of change in the contact area by reflecting the curvature of the substrate surface in advance, it is possible to know the amount of change in the contact area in which the contact/release velocity becomes a constant velocity.

Figure 8:
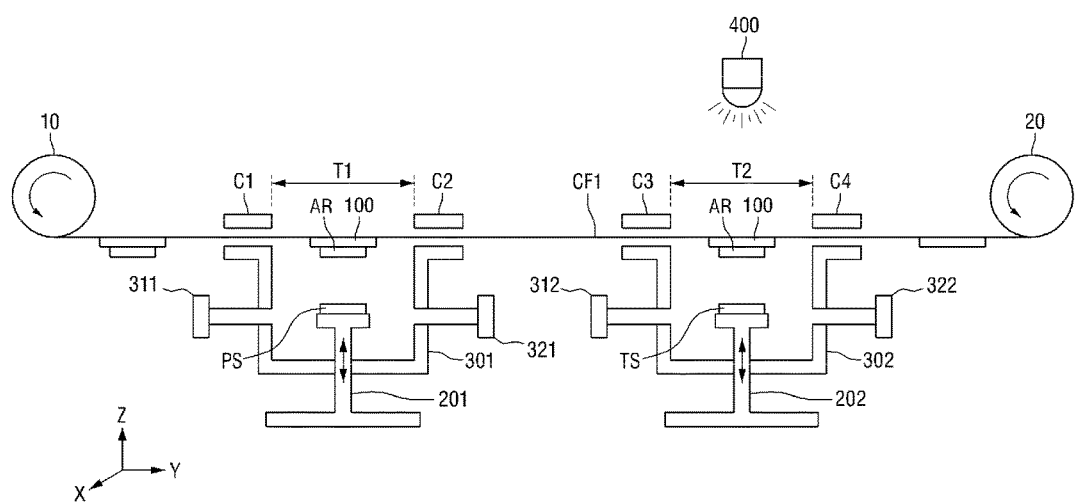
FIG. 8 is a cross-sectional view of a manufacturing device of an anti-reflecting structure according to still another example embodiment of the inventive concepts.

FIG. 8 is a cross-sectional view of a manufacturing device of an anti-reflecting structure according to another example embodiment of the inventive concepts. For convenience of explanation, substantially the same parts as those of the manufacturing device of the anti-reflecting structure according to embodiments of the inventive concepts will not be described.

Referring to FIG. 8, a manufacturing device 3 of an anti-reflecting structure according to another example embodiment of the inventive concepts includes an unwinding unit 10, a winding unit 20, a stamp structure 100, a first substrate support unit 201, a first chamber 301, first vent holes 311, 321, a second substrate support unit 202, a second chamber 302, second vent holes 312, 322, and a heating unit 400.

The unwinding unit 10, the winding unit 20, the stamp structure 100, the first substrate support unit 201, the first chamber 301, the first vent holes 311, 321, the second substrate support unit 202, the second chamber 302, the second vent holes 312, 322 and the heating unit 400 are substantially the same as the respective components described above.

The manufacturing device 3 of the anti-reflecting structure includes the first substrate support unit 201 provided with the planar substrate PS and the second substrate support unit 202 provided with the target substrate TS as separate configurations. That is, in the course of roll-to-roll process, the planar substrate PS is provided into the first chamber 301, and the first resin R1 on the planar substrate PS can be provided to the stamp structure 100. Moreover, the stamp structure 100 is moved into the second chamber 302, the target substrate TS is provided into the second chamber 302, and the stamp structure 100 can form the anti-reflecting structure AR on the target substrate TS.

Figure 9:
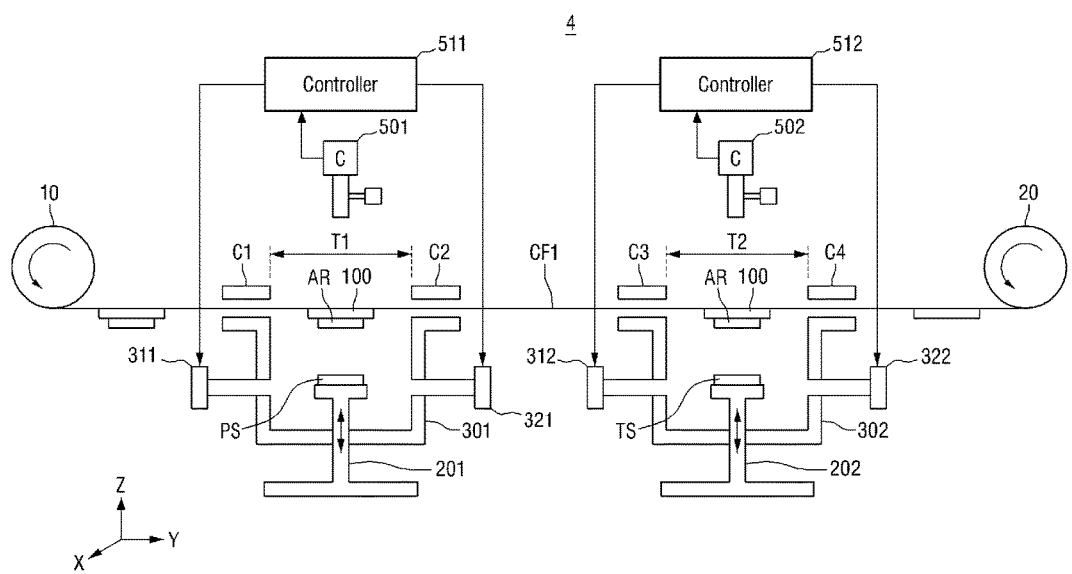
FIG. 9 is a cross-sectional view of a manufacturing device of an anti-reflecting structure according to still another example embodiment of the inventive concepts.

FIG. 9 is a cross-sectional view of a manufacturing device of an anti-reflecting structure according to another example embodiment of the inventive concepts. For convenience of explanation, substantially the same parts as those of the manufacturing device of the anti-reflecting structure according to embodiments of the inventive concepts will not be described.

Referring to FIG. 9, a manufacturing device 4 of an anti-reflecting structure according to another example embodiment of the inventive concepts includes a unwinding unit 10, a winding unit 20, a stamp structure 100, a first substrate support unit 201, a first chamber 301, first vent holes 311, 321, a second substrate support unit 202, a second chamber 302, second vent holes 312, 322, first and the second imaging units 501, 502, first and second controllers 511, 512 and the like.

The unwinding unit 10, the winding unit 20, the stamp structure 100, the first substrate support unit 201, the first chamber 301, the first vent holes 311, 321, the second substrate support unit 202, the second chamber 302, and the second vent holes 312, 322 is substantially the same as the above-described components, respectively.

Moreover, the first and second imaging units 501, 502, for example, can include a vision recognition camera. The first imaging unit 501 can be disposed on the first target area T1 of the carrier film CF1, and the second imaging unit 502 can be disposed on the second target area T2 of the carrier film CF1.

According to various example embodiments, each of the first and second controllers 511, 512 is connected to the first vent holes 311, 321 and the second vent holes 312, 322, respectively, in order to be able to control the operation of the first vent holes 311, 321 and the second vent holes 312, 322. Further, the controllers can also adjust the intensity of pressure applied to the carrier film CF1, by controlling the operation of the first vent holes 311, 321 and the second vent holes 312, 322. By adjusting the intensity of pressure applied to the carrier film CF1, it is possible to control the increase velocity of the area of contact between the stamp structure 100 and planar substrate PS and/or between the stamp structure 100 and the target substrate TS to become a constant velocity.

Figure 10:
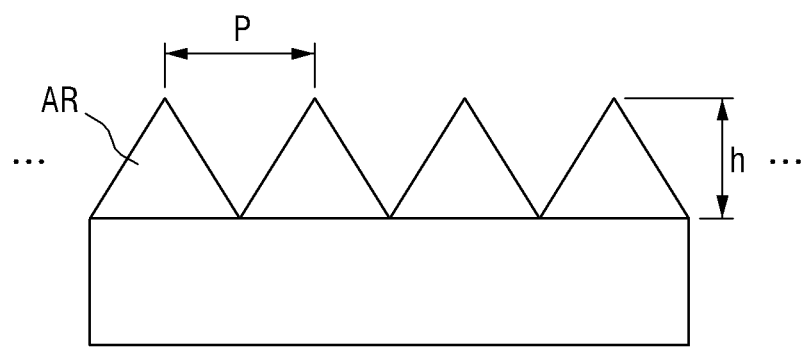
FIG. 10 is a cross-sectional view of the anti-reflecting structure manufactured using the manufacturing device of the anti-reflecting structure according to example embodiments of the inventive concepts.

FIG. 10 is a cross-sectional view of the anti-reflecting structure manufactured using the manufacturing device of the anti-reflecting structure according to example embodiments of the inventive concepts.

Referring to FIG. 10, the anti-reflecting structure manufactured using the manufacturing device of the anti-reflecting structure according to example embodiments of the inventive concepts can be formed by a plurality of filler portions, and the plurality of filler portions can have a specific period P and a specific height h. Here, the period P refers to a distance between the highest points of adjacent filler portions, and the height h refers to the distance between the substrate surface and the highest point of the filler portion. The optimized cycle P and height h in the inventive concepts follow the following equation.

$$P < \lambda + a \text{ } (\lambda\text{: wavelength of light, } a\text{: scale factor } (1<a<2)) \quad \text{[Equation 1]}$$

$$0.4*\lambda < h < \lambda \quad \text{[Equation 2]}$$

The filler portion of the inventive concepts satisfies the above-mentioned conditions, and has an optimum anti-reflecting effect at this time.

Hereinafter, a method for manufacturing the anti-reflecting structure according to an example embodiment of the inventive concepts will be described.

Figure 11:
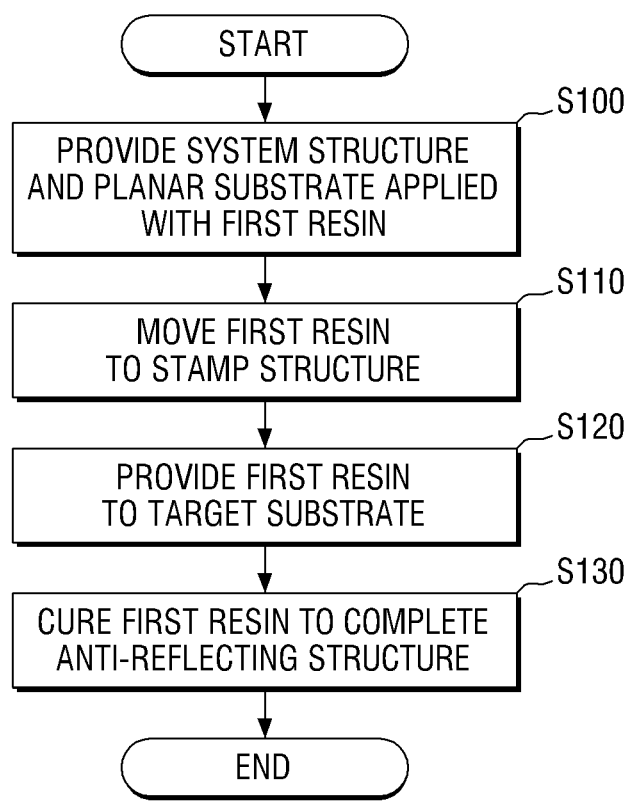
FIG. 11 is a flow chart which sequentially illustrates the manufacturing method for the anti-reflecting structure according to an example embodiment of the inventive concepts.
Figure 12:
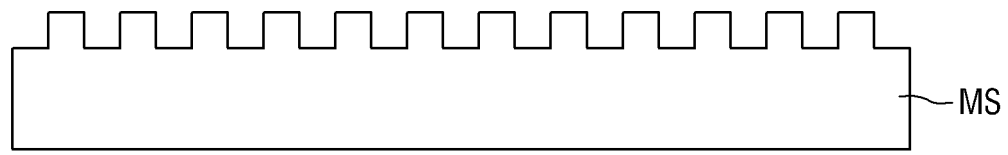
FIGS. 12 to 18 are intermediate-stage diagrams for describing a method for manufacturing the anti-reflecting structure according to an example embodiment of the inventive concepts.
Figure 13:
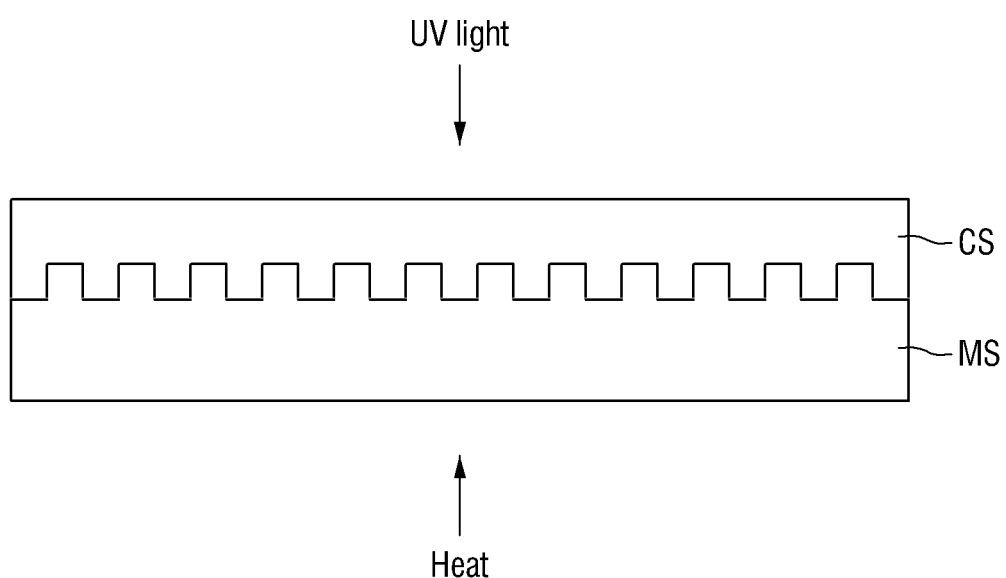

FIG. 11 is a flow chart which sequentially illustrates the manufacturing method for the anti-reflecting structure according to an example embodiment of the inventive concepts. FIGS. 12 to 18 are intermediate-stage diagrams illustrating the manufacturing method for the anti-reflecting structure according to an example embodiment of the inventive concepts.

Referring to FIGS. 11 to 18, the manufacturing method for the anti-reflecting structure according to an example embodiment of the inventive concepts provides, first, a stamp structure CS, and a planar substrate PS applied with the first resin R1 (S100).

For the formation of the stamp structure CS, a master substrate MS formed with the anti-reflecting pattern is provided, and after applying the first material onto the master substrate MS, the first material is cured using the light and heat to form the stamp structure CS.

The first material used in the inventive concepts, for example, can include polydimethysiloxane. Polydimethysiloxane can be cured by ultraviolet ray and has high releasability from the master substrate MS due to the low surface energy.

Figure 14:
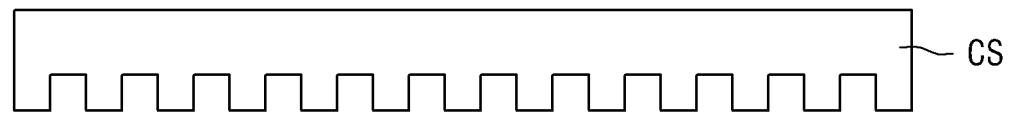
Figure 15:
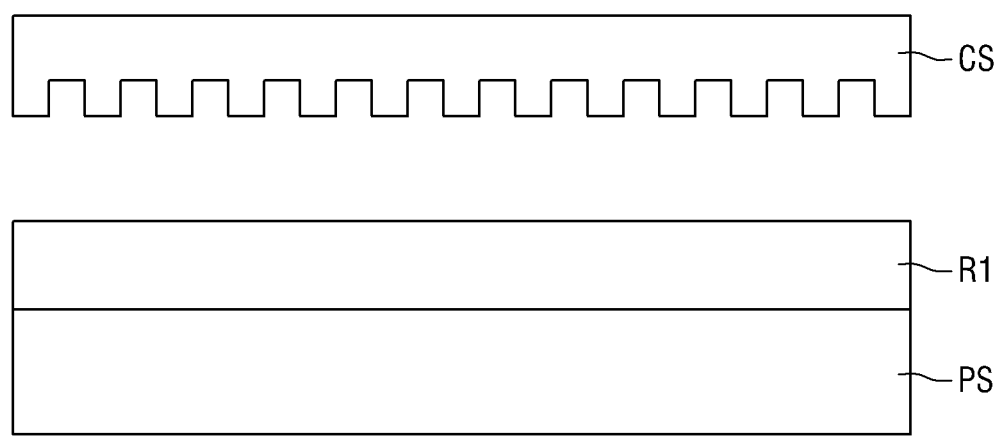

Referring to FIGS. 14 and 15, by separating the stamp structure CS after the contact on the planar substrate PS applied with the first resin R1, at least a part of the first resin R1 is moved to the stamp structure CS (S110).

At this time, it is possible to perform the contact or separation between the stamp structure CS and the planar substrate PS, by discharging or injecting air through the vent holes formed in the chamber 301/302.

Further, the contact velocity or the separation velocity of the stamp structure CS and the planar substrate PS is controlled by recognizing an amount of change in the contact area between the stamp structure CS and the planar substrate PS, and it is possible to control the stamp structure CS and the planar substrate PS so as to be brought into contact with, or separated from, each other at a constant velocity.

Figure 16:
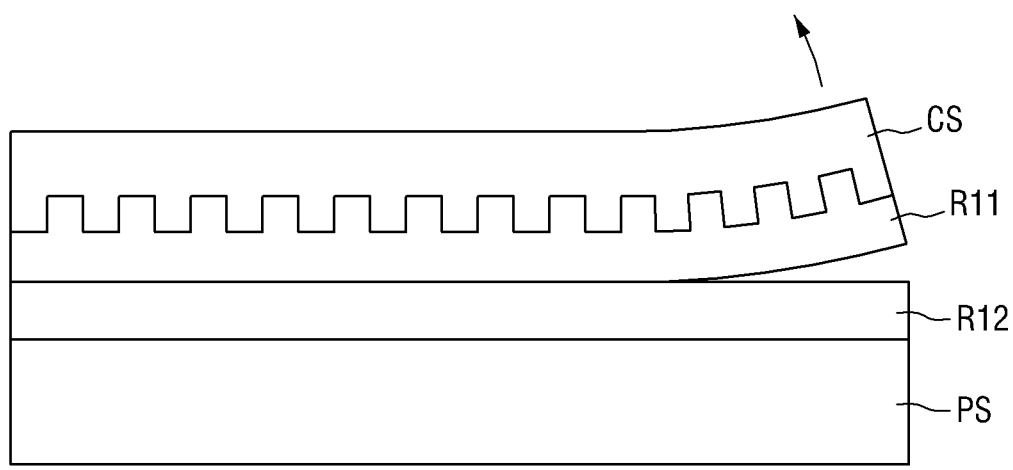
Figure 17:
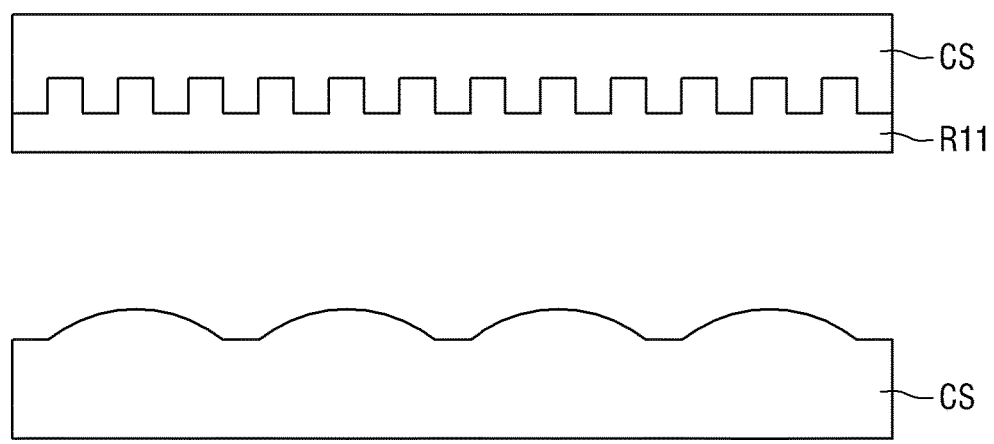
Figure 18:
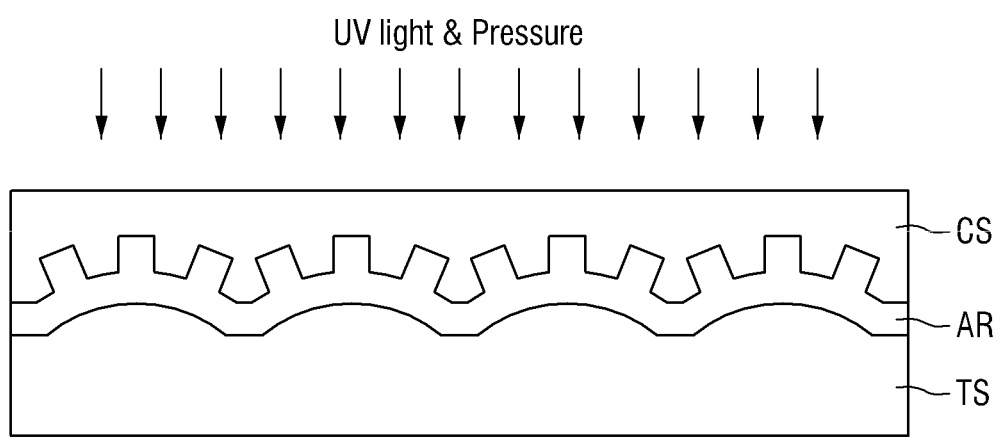

Referring to FIGS. 16 and 17, after the first resin R1 on the stamp structure CS is provided to the target substrate TS (S120), the first resin R1 is cured by providing ultraviolet ray and pressure, thereby completing the anti-reflecting structure AR (S130). At this time, by discharging or injecting the air through the vent holes formed in the chamber, the contact or separation between the stamp structure CS and the target substrate TS is performed, and the first resin R1 on the stamp structure CS can be provided to the target substrate TS.

Moreover, the contact velocity or separation velocity of the stamp structure CS and the target substrate TS is controlled by recognizing the amount of change in the contact area between the stamp structure CS and the target substrate TS, and it is possible to control the stamp structure CS and the target substrate TS so as to be brought into contact with or separated from each other at a constant velocity.

Figure 19:
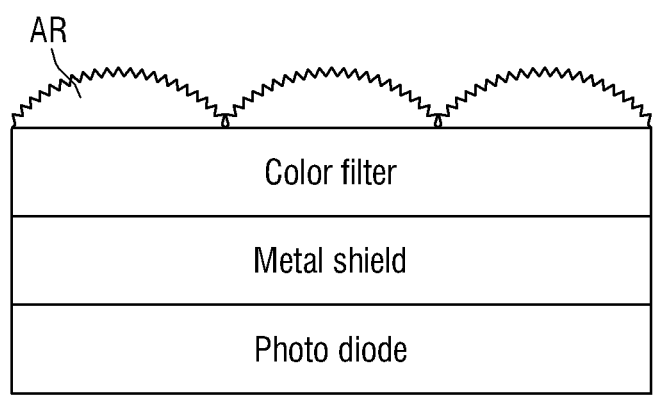
FIG. 19 is a diagram illustrating a CIS to which the anti-reflecting structure manufactured using the manufacturing device of the anti-reflecting structure according to example embodiments of the inventive concepts is applied.

FIG. 19 is a diagram illustrating a CIS to which the anti-reflecting structure manufactured using the manufacturing device of the anti-reflecting structure according to example embodiments of the inventive concepts is applied.

Referring to FIG. 19, the anti-reflecting structure manufactured using the manufacturing device of the anti-reflecting structure according to example embodiments of the inventive concepts can be applied to the CIS (CMOS Image Sensor). At the uppermost part of the CIS which receives light and converts it into an electric signal, there is a micro-lens array (MLA) which condenses light by a photodiode for each pixel. When coating the anti-reflective structure AR on such a micro-lens array (MLA), an effect of increase in an amount of light transmitted to the photodiode occurs. Due to such effects, it is possible to obtain a clear image even in low illuminance environments. Also, it is possible to obtain an effect of reducing the amount of light reflected by the surface of the CIS, and thus, it is possible to reduce the occurrence of ghost image due to noise reflection light during image acquisition.

Figure 20:
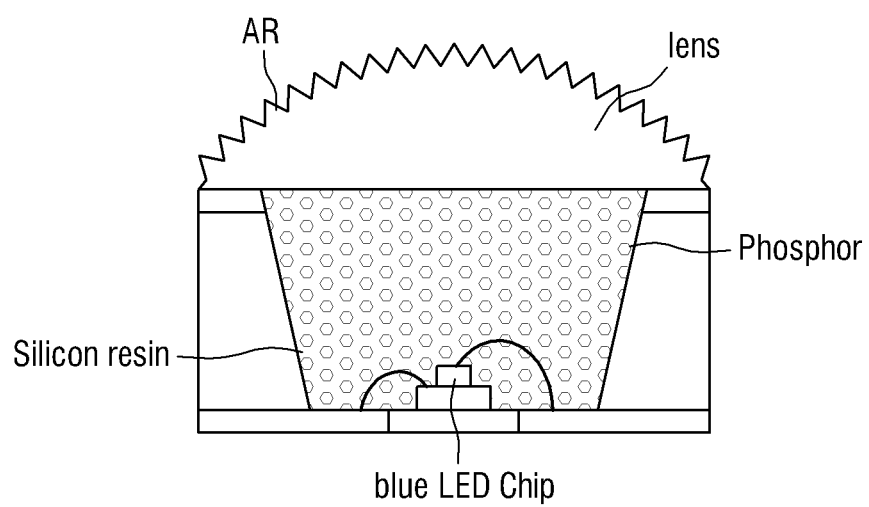
FIG. 20 is a diagram illustrating an LED device to which the anti-reflecting structure manufactured using the manufacturing device of the anti-reflecting structure according to example embodiments of the inventive concepts is applied.

FIG. 20 is a diagram illustrating an LED device to which the anti-reflecting structure manufactured using the manufacturing device of the anti-reflecting structure according to example embodiments of the inventive concepts is applied.

Referring to FIG. 20, the anti-reflecting structure manufactured using the manufacturing device of the anti-reflecting structure according to example embodiments of the inventive concepts can be applied to the LED device. The LED device receives an electrical signal to generate light. In the LED device, there is a lens structure that serves to collect the light generated from the LED chip in a particular direction or widely expand the light. If the anti-reflecting structure AR is formed at the interface between the lens structure and the air, by reducing the amount of light that is reflected by the inside of the LED device, it is possible to increase the brightness of the light emitted to the outside of the LED device. Due to such effects, it is possible to generate a brighter light in the same power consumption, and it is possible to expect less power consumption and long life at the same brightness.

Figure 21:
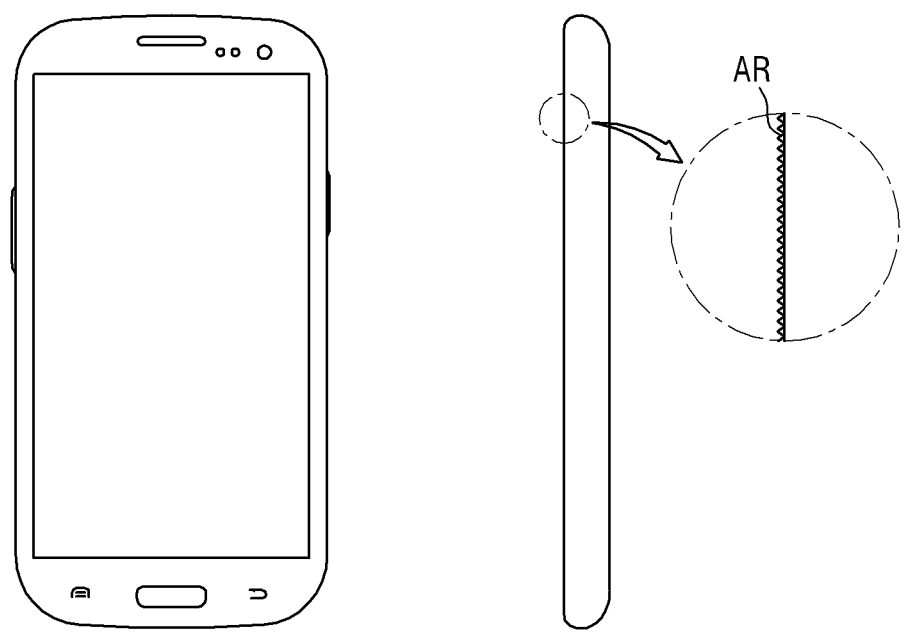
FIG. 21 is a diagram illustrating a mobile display to which the anti-reflecting structure manufactured using the manufacturing device of the anti-reflecting structure according to example embodiments of the inventive concepts is applied.

FIG. 21 is a diagram illustrating a mobile display to which the anti-reflecting structure manufactured using the manufacturing device of the anti-reflecting structure according to example embodiments of the inventive concepts is applied.

Referring to FIG. 21, the anti-reflecting structure manufactured using the manufacturing device of the anti-reflecting structure according to example embodiments of the inventive concepts can be applied to a mobile display. If the anti-reflecting structure AR is formed at the interface between the mobile display and air, it is possible to reduce a phenomenon in which the image is degraded or appears to be excessively brighter due to reflection of the light that is incident from the outside of the mobile display. If it is applied to a display device of a mobile display or a wearable device which is often used in an outside area in which the periphery is bright, it is possible to maximize these effects.

While the inventive concepts have been particularly shown and described with reference to example embodiments thereof, it will be understood by those of ordinary skill in the art that various changes in form and details may be made therein without departing from the spirit and scope of the inventive concepts as defined by the following claims. It is therefore desired that the example embodiments be considered in all respects as illustrative and not restrictive, reference being made to the appended claims rather than the foregoing description to indicate the scope of the inventive concepts.

What is claimed is:

1. A manufacturing device of an anti-reflecting structure comprising:
   a carrier film having a stamp structure thereon;
   an unwinding unit configured to unwind the carrier film;
   a substrate support unit configured to provide a target substrate to the carrier film;
   a pressing unit configured to apply pressure to the carrier film so that a resin provided in the stamp structure is provided to the target substrate; and
   a winding unit configured to wind the carrier film, the carrier film being configured to transfer an anti-reflecting pattern to the target substrate,
   wherein the pressing unit includes a chamber configured to store the target substrate, and a vent hole in the chamber,
   the vent hole is configured to discharge air within the chamber to lower air pressure in the chamber and to apply the pressure to the carrier film, and
   wherein the anti-reflecting structure includes first to n-th filler portions (n is an integer number equal to 2 or more), first to (n−1)-th spacings each of which being included between the first to n-th filler portions, first to n-th pillar portions have each of first to n-th height, and the first to (n−1)-th spacing and the first to n-th height are smaller than a wavelength of incident light or emitted light.

2. The manufacturing device of the anti-reflecting structure of claim 1, further comprising:
   an imaging unit configured to recognize an amount of change in an area of contact between the carrier film and the target substrate.

3. The manufacturing device of the anti-reflecting structure of claim 2, further comprising:
   a controller configured to control an operation of the pressing unit based on a recognition result of the imaging unit.

4. The manufacturing device of the anti-reflecting structure of claim 1, further comprising:
   a heating unit configured to heat the anti-reflecting pattern provided to the target substrate.

5. The manufacturing device of the anti-reflecting structure of claim 1, wherein the stamp structure includes a polydimethysiloxane material.

6. The manufacturing device of the anti-reflecting structure of claim 1, wherein the anti-reflecting pattern includes an acryl material or an epoxy material.

7. A manufacturing device of an anti-reflecting structure comprising:
   a carrier film having a stamp structure applied thereon with a first resin;
   an unwinding unit configured to unwind the carrier film;
   a substrate support unit configured to provide a planar substrate or a target substrate to the carrier film;

a winding unit configured to wind the carrier film from which an anti-reflecting pattern is transferred to the target substrate; and a pressing unit configured to discharge air within a chamber to lower air pressure and to apply pressure to the carrier film so that a second resin provided in the stamp structure is provided to the target substrate, wherein the second resin is on the planar substrate, at least a part of the second resin is provided to the stamp structure, and the second resin provided to the stamp structure is provided to the target substrate to form the anti-reflecting pattern on the target substrate, and wherein the anti-reflecting structure includes first to n-th filler portions (n is an integer number equal to 2 or morel, first to (n−1)-th spacings each of which being included between the first to n-th filler portions, first to n-th pillar portions have each of first to n-th height, and the first to (n−1)-th spacing and the first to n-th height are smaller than a wavelength of incident light or emitted light.

8. The manufacturing device of the anti-reflecting structure of claim 7, wherein the first resin and the second resin include a same material.

9. The manufacturing device of the anti-reflecting structure of claim 8, wherein a first curvature of the first resin on the stamp structure is greater than a second curvature of the second resin applied onto the planar substrate.

10. The manufacturing device of the anti-reflecting structure of claim 9, wherein after contact between the first resin and the second resin, the second resin is provided to the stamp structure.

11. The manufacturing device of the anti-reflecting structure of claim 10, wherein the first resin and the second resin initially come into point-contact with each other.

12. The manufacturing device of the anti-reflecting structure of claim 7, further comprising:

a heating unit configured to heat the anti-reflecting pattern provided to the target substrate.

13. The manufacturing device of the anti-reflecting structure of claim 7, wherein the pressing unit includes a vent hole in the chamber, and the vent hole is configured to discharge air in the chamber to lower the air pressure in the chamber and to apply the pressure to the carrier film.

14. The manufacturing device of the anti-reflecting structure of claim 13, further comprising:

an imaging unit configured to recognize an amount of change in an area of contact between the carrier film and the target substrate.

15. The manufacturing device of the anti-reflecting structure of claim 14, further comprising:

a controller configured to control an operation of the pressing unit based on a recognition result of the imaging unit.

16. A manufacturing device of an anti-reflecting structure comprising:

first and second chambers;

a stamp structure in the first chamber;

a planar substrate in the first chamber and to which a first resin is applied;

a target substrate in the second chamber; and a pressing unit configured to discharge air within the second chamber through a vent hole formed in the second chamber to lower air pressure in the second chamber and to apply pressure to the stamp structure, wherein at least a part of the first resin is on the stamp structure via contact between the stamp structure and the planar substrate within the first chamber, the stamp structure with the first resin thereon moves to the second chamber, and the stamp structure provides the first resin to the target substrate to form an anti-reflecting pattern on the target substrate, and wherein the anti-reflecting structure includes first to n-th filler portions (n is an integer number equal to 2 or morel, first to (n−1)-th spacings each of which being included between the first to n-th filler portions, first to n-th pillar portions have each of first to n-th height, and the first to (n−1)-th spacing and the first to n-th height are smaller than a wavelength of incident light or emitted light.

17. The manufacturing device of the anti-reflecting structure of claim 16, wherein a second resin is applied onto the stamp structure.

18. The manufacturing device of the anti-reflecting structure of claim 17, wherein the first resin and the second resin include a same material.

* * * * *